(No Model.)
L. RUNDELL.
CUTTING APPARATUS FOR MOWERS AND REAPERS.
No. 323,599. Patented Aug. 4, 1885.
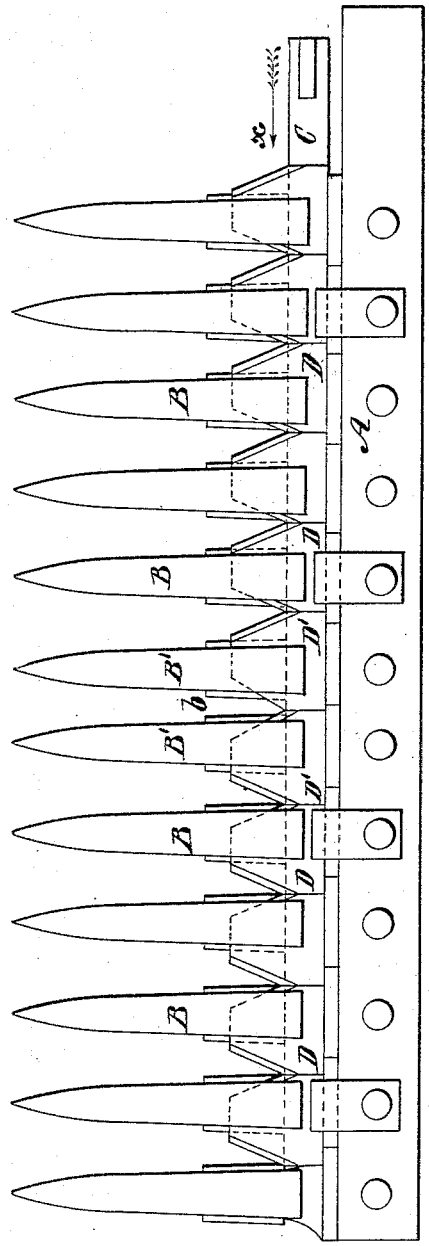
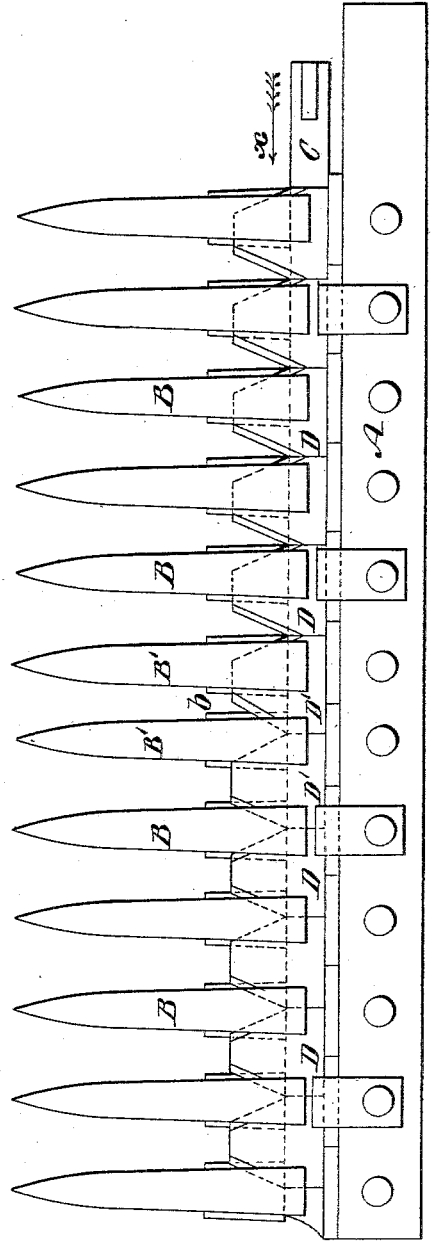
WITNESSES:
INVENTOR:
L. Rundell
BY
ATTORNEYS.

United States Patent Office.

LUMAN RUNDELL, OF NEW BALTIMORE, NEW YORK.

CUTTING APPARATUS FOR MOWERS AND REAPERS.

SPECIFICATION forming part of Letters Patent No. 323,599, dated August 4, 1885.

Application filed September 5, 1884. (No model.)

*To all whom it may concern:*

Be it known that I, LUMAN RUNDELL, of New Baltimore, in the county of Greene and State of New York, have invented certain new and useful Improvements in Cutting Apparatus for Mowers and Reapers, of which the following is a full, clear, and exact description.

The object of this invention is to ease the cut and to reduce the shock and jerk which usually takes place in the reciprocating action of the cutter at the ends of its stroke, thus lessening jar, tear, and wear, and lightening the draft.

The invention consists in a special construction, substantially as hereinafter described, of the central fingers and central cutting tooth or teeth of a serrated cutter-bar arranged to reciprocate, as usual, through the fingers or guards, whereby the cutting-teeth throughout the one half or portion of the length of the bar when moving in either direction are made to complete or nearly complete their cut before the cutting-teeth on the other half or portion of the length of the bar come into cutting position with the fingers or guards, thus dividing up and easing the cut in both directions of the cutter-bar's travel.

Reference is to be had to the accompanying drawings, forming a part of this specification, in which similar letters of reference indicate corresponding parts in all the figures.

Figures 1 and 2 represent plan or top views of the finger-bar, fingers or guards, and reciprocating serrated cutter of a mower or reaper embodying my invention, and showing, respectively, the cutter in different positions when moving in the same direction. The usual track guard and shoe at opposite ends of the finger-bar are not shown, the same, though used, forming no part of my invention.

A indicates the finger-bar, and B B' the fingers or guards through or in connection with which the reciprocating cutter works to effect the cut. C is the cutter-bar, and D D' the cutting teeth or sections mounted on said bar, and sharpened on their opposite side edges, as usual, to cut in both directions of their travel with or against the opposite cutting-edges of the fingers.

The middle or intermediate fingers, B' B', are arranged somewhat closer to each other than the remaining fingers B on each side of them, thus narrowing the finger-space $b$ between the central or approximately central portion of the cutting device. Furthermore, the middle or intermediate cutting-teeth, D', or single tooth, where the fingers B B' are of an odd instead of an even number, are made wider at their base ends than the remaining teeth D on either side of said tooth or teeth D'.

The several spaces between the fingers B on each side of the fingers B' B' are or may be of equal width, and the several cutting-teeth D on each side of the enlarged tooth or teeth D' are or may be of like width with one another at their bases. This different spacing of the central or intermediate fingers relatively to the remaining fingers on either side thereof and varying width of the central or intermediate tooth or teeth relatively to the remaining teeth on either side of the same virtually amounts to lengthening the cutter-bar and shortening the finger-bar in their centers or intermediate portions. Each of these features or peculiarities—that is, the narrowing of the space $b$ between the intermediate fingers and the widening of the central or intermediate tooth or teeth separately—serves to a certain extent to produce the desired result; but combined the action is more perfect, and the space between the intermediate fingers, B' B', need not be as contracted as would be necessary were the intermediate cutting tooth or teeth, D', not of greater width than the remaining teeth D. Thus the chance for clogging between the intermediate fingers is reduced.

That the operation of the invention is as hereinbefore specified will be clear from examination of the drawings. Thus, supposing the cutter-bar to be moving in the direction indicated by the arrows $x$ $x$ in both figures, the cutting-teeth D on the left-hand side, Fig. 1, are about commencing to cut, while the teeth D on the right-hand side have completed their cut, and when the cutter-bar reaches the position shown in Fig. 2 the teeth D on the right-hand side of the bar are about to begin to cut as or after the teeth D on the left-hand side have completed their cut. The same effect takes place when the cutter-bar moves in the reverse direction, thus dividing up and easing the cut in both directions of the cutter's travel.

Having thus fully described my invention, I claim as new and desire to secure by Letters Patent—

1. In a mower or reaper cutting mechanism, the combination, with a reciprocating serrated cutter, of the central or intermediate fingers or guards arranged in closer relation with each other than the remaining fingers or guards, substantially as specified.

2. In a mower or reaper cutting mechanism, the combination, with the fingers or guards, of a reciprocating serrated cutter having its central or intermediate tooth or teeth of greater width than the remaining teeth, essentially as described.

3. In a mower or reaper cutting mechanism, the combination of the serrated cutter having its central or intermediate tooth or teeth of greater width than the remaining teeth to either side thereof, and the finger-bar having its central or intermediate fingers arranged in closer proximity to each other than the remaining fingers to either side thereof, substantially as and for the purposes specified.

LUMAN RUNDELL.

Witnesses:
A. GREGORY,
C. SEDGWICK.